(12) United States Patent
Mozumdar et al.

(10) Patent No.: US 11,700,270 B2
(45) Date of Patent: Jul. 11, 2023

(54) SYSTEMS AND METHODS FOR DETECTING A COMMUNICATION ANOMALY

(71) Applicant: THE AEROSPACE CORPORATION, El Segundo, CA (US)

(72) Inventors: Mohammad Mozumdar, Cypress, CA (US); Philip A. Dafesh, Manhattan Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 957 days.

(21) Appl. No.: 16/279,591

(22) Filed: Feb. 19, 2019

(65) Prior Publication Data

US 2020/0267171 A1   Aug. 20, 2020

(51) Int. Cl.
*H04L 9/40* (2022.01)
*G06N 20/00* (2019.01)
*G06F 13/42* (2006.01)

(52) U.S. Cl.
CPC ...... *H04L 63/1425* (2013.01); *G06F 13/4282* (2013.01); *G06N 20/00* (2019.01); *H04L 63/1416* (2013.01)

(58) Field of Classification Search
CPC . H04L 63/1425; H04L 63/1416; G06N 20/00; G06F 13/4282
USPC ..................................................... 726/22–25
See application file for complete search history.

(56) References Cited

U.S. PATENT DOCUMENTS

| | | | |
|---|---|---|---|
| 9,906,545 B1* | 2/2018 | Zhao | H04L 63/1416 |
| 10,091,077 B1* | 10/2018 | Pukish | H04L 67/12 |
| 10,326,788 B1* | 6/2019 | Bajpai | H04L 63/1416 |
| 10,326,793 B2* | 6/2019 | Wesie | H04L 63/1416 |
| 2005/0239598 A1* | 10/2005 | Bauerle | B60W 50/0205 477/111 |
| 2005/0240333 A1* | 10/2005 | Bauerle | F02D 41/021 123/352 |
| 2006/0026314 A1* | 2/2006 | Franchuk | H04L 12/4135 719/318 |

(Continued)

OTHER PUBLICATIONS

Narayanan et al., OBD SecureAlert: An Anomaly Detection System for Vehicles, IEEE (Year: 2016).*

(Continued)

*Primary Examiner* — Kambiz Zand
*Assistant Examiner* — Mahabub S Ahmed
(74) *Attorney, Agent, or Firm* — One LLP

(57) ABSTRACT

Cyberattacks are rampant and can play a major role in modern warfare, particularly on a widely adopted platforms such as the MIL-STD-1553 standard. To protect a 1553 communication bus system from attacks, a trained statistical or machine learning model can be used to monitor commands from a bus controller of the 1553 communication bus system. The statistical and/or machine learning model can be trained to recognize communication anomalies based at least on the probability distribution of patterns of one or more commands. The statistical model can be stochastic model such as a Markov chain that describes a sequence of possible commands in which the probability of each command depends on the occurrence of a group of one or more commands.

20 Claims, 17 Drawing Sheets

(56) References Cited

U.S. PATENT DOCUMENTS

| | | | | |
|---|---|---|---|---|
| 2010/0256835 A1* | 10/2010 | Mudalige | ............... | G08G 1/164 701/2 |
| 2011/0167493 A1* | 7/2011 | Song | ................... | H04L 63/1425 726/23 |
| 2013/0234724 A1* | 9/2013 | Kabasawa | ............... | G01R 31/00 324/537 |
| 2014/0230062 A1* | 8/2014 | Kumaran | ............ | H04L 63/1408 726/24 |
| 2015/0355957 A1* | 12/2015 | Steiner | .................. | G06F 21/552 714/37 |
| 2015/0370752 A1* | 12/2015 | Hammel | ............ | G06F 13/4282 710/105 |
| 2016/0021127 A1* | 1/2016 | Yan | ........................ | H04W 12/08 726/23 |
| 2016/0114886 A1* | 4/2016 | Downey | .................. | H04L 47/25 701/2 |
| 2016/0173513 A1* | 6/2016 | Rohde | ................... | H04L 63/126 726/23 |
| 2016/0188396 A1* | 6/2016 | Sonalker | ............... | G06F 11/079 714/37 |
| 2016/0188876 A1* | 6/2016 | Harris | ...................... | G06N 20/00 726/23 |
| 2016/0189056 A1* | 6/2016 | Mayhew | ................ | G06N 20/10 706/12 |
| 2016/0381068 A1* | 12/2016 | Galula | ................. | G07C 5/0816 726/23 |
| 2017/0013005 A1* | 1/2017 | Galula | ................. | H04L 63/1425 |
| 2017/0118038 A1* | 4/2017 | Ujiie | .................... | H04L 12/4625 |
| 2018/0091550 A1* | 3/2018 | Cho | ................. | G01R 19/16533 |
| 2018/0144119 A1* | 5/2018 | Kishikawa | .......... | B60R 16/0231 |
| 2018/0189483 A1* | 7/2018 | Litichever | ............... | H04L 67/12 |
| 2018/0196941 A1* | 7/2018 | Ruvio | ................ | H04L 63/0227 |
| 2018/0284735 A1* | 10/2018 | Cella | .................. | G06V 10/7784 |
| 2018/0295147 A1* | 10/2018 | Haga | ................. | H04L 12/40006 |
| 2018/0365094 A1* | 12/2018 | Sonalker | ............ | H04L 63/1425 |
| 2018/0367553 A1* | 12/2018 | Hayden | ............ | H04L 63/1425 |
| 2019/0098047 A1* | 3/2019 | Giannopoulos | ..... | H04L 63/1483 |
| 2019/0116157 A1* | 4/2019 | Kishikawa | ............ | G06F 21/645 |
| 2019/0149561 A1* | 5/2019 | Maeda | ................ | B60R 16/0232 726/23 |
| 2019/0149562 A1* | 5/2019 | Maeda | ..................... | H04L 12/28 726/23 |
| 2019/0173902 A1* | 6/2019 | Takahashi | ............... | G06N 20/20 |
| 2019/0245872 A1* | 8/2019 | Shin | ........................ | H04L 12/40 |
| 2019/0303567 A1* | 10/2019 | Batmaz | ................... | G06F 21/85 |
| 2019/0306180 A1* | 10/2019 | Dyakin | ................... | G06F 21/566 |
| 2019/0306187 A1* | 10/2019 | Dyakin | ................... | H04L 63/20 |
| 2019/0311120 A1* | 10/2019 | Jaenisch | ............... | G06F 21/566 |
| 2019/0312892 A1* | 10/2019 | Chung | .................. | G06F 21/554 |
| 2019/0384771 A1* | 12/2019 | Kurita | .................... | G06F 16/254 |
| 2019/0385057 A1* | 12/2019 | Litichever | ............ | H04L 63/14 |
| 2020/0021611 A1* | 1/2020 | Maeda | ............ | H04L 12/40013 |
| 2020/0053112 A1* | 2/2020 | Torisaki | .............. | H04L 63/1458 |
| 2020/0090426 A1* | 3/2020 | Barnes | ...................... | G06N 5/01 |
| 2020/0183373 A1* | 6/2020 | Choi | ..................... | G05B 23/024 |
| 2020/0216027 A1* | 7/2020 | Deng | .................. | H04L 63/1416 |
| 2020/0344083 A1* | 10/2020 | Shibahara | ............. | H04L 5/0044 |
| 2020/0387605 A1* | 12/2020 | Gilad | ..................... | G06F 21/566 |
| 2020/0389469 A1* | 12/2020 | Litichever | ............. | H04L 63/029 |
| 2020/0394341 A1* | 12/2020 | Bitton | ..................... | G06F 21/85 |
| 2021/0044610 A1* | 2/2021 | Kishikawa | ............... | H04L 12/40 |
| 2021/0044612 A1* | 2/2021 | Kawauchi | .......... | B60W 50/0225 |
| 2021/0067523 A1* | 3/2021 | Kamp | .................. | H04L 63/1416 |
| 2021/0116907 A1* | 4/2021 | Altman | ................... | H04W 4/44 |
| 2021/0120024 A1* | 4/2021 | Ladd | ................. | H04L 12/40045 |
| 2021/0144026 A1* | 5/2021 | Stein | ..................... | G06F 21/554 |
| 2021/0203682 A1* | 7/2021 | Bajpai | .................... | G06F 21/55 |
| 2021/0237665 A1* | 8/2021 | Tamura | ................. | G06F 21/552 |
| 2021/0274010 A1* | 9/2021 | Stein | ........................ | H04W 4/44 |
| 2021/0368007 A1* | 11/2021 | Hasegawa | ............. | G06F 21/554 |
| 2022/0046114 A1* | 2/2022 | Entelis | .................... | H04L 12/40 |

OTHER PUBLICATIONS

Gmiden, et al., An Intrusion Detection Method for Securing In-Vehicle CAN bus, 17th international conference on Sciences and Techniques of Automatic control & computer engineering—STA'2016, Sousse, Tunisia, Dec. 19-21, 2016 (Year: 2016).*

Taylor, Anomaly-based detection of malicious activity in in-vehicle networks, Ph. D thesis—Ottawa-Carleton Institute for Electrical and Computer Engineering University of Ottawa (Year: 2017).*

Abbott-McCune; Intrusion Prevention System of Automotive network CAN bus; IEEE (Year: 2016).*

Song et al.; Intrusion Detection System Based on the Analysis of Time Intervals of CAN Messages for In-Vehicle Network; IEEE (Year: 2016).*

Checkoway, S., et al., "Comprehensive Experimental Analyses of Automotive Attack Surfaces", 2011, retrieved from http://www.autosec.org/pubs/cars-usenixsec2011.pdf on Apr. 23, 2019, pp. 1-16.

Cho, KT, et al., "Fingerprinting Electronic Control Units for Vehicle Intrusion Detection", Proceedings of the 25th USENIX Security Symposium, Austin, TX, Aug. 10-12, 2016, pp. 1-18.

Chong, J., et al., "Survivability Architecture of a Mission Critical System: The DPASA[1] Example", Proceedings of the 21st Annual Computer Security Applications Conference, 2005, pp. 1-10.

Hoppe, T., et al., "Security threats to automotive CAN networks—Practical examples and selected short-term counter measures", Reliability Engineering and System Safety, 2011, vol. 96, pp. 11-25.

Kang, MJ, et al., "Intrusion Detection System Using Deep Neural Network for In-Vehicle Network Security", PLoS ONE, 2016, vol. 11, No. 6, pp. 1-17.

Kleberger, P., et al., "Security Aspects of the In-Vehicle Network in the Connected Car", 2011 IEEE Intelligent Vehicles Symposium (IV), Baden-Baden, Germany, Jun. 5-9, 2011, pp. 528-533.

Matsumoto, T., et al., "A Method of Preventing Unauthorized Data Transmission in Controller Area Network", 2012 IEEE 75th Vehicular Technology Conference (VTC Spring), Yokohama, Japan, May 6-9, 2012, pp. 1-5.

McGraw, R. M., et al., "Cyber threat impact assessment and analysis for space vehicle architectures", Proceedings of SPIE, 2014, Sensors and Systems for Space Applications VII, vol. 9085, pp. 90850K-1-90850K-11.

MIL-STD-1553 Designer's Guide, Sixth Edition, 1998, retrieved from, ftp://mssls7.mssl.ucl.ac.uk/pub/1553/buS1_4hg.pdf on Apr. 23, 2019, pp. 1-174.

Müter, M., et al., "Entropy-Based Anomaly Detection for In-Vehicle Networks", 2011 IEEE Intelligent Vehicles Symposium (IV), Baden-Baden, Germany, Jun. 5-9, 2011, pp. 1110-1115.

Nguyen, T. D., "Towards MIL-STD-1553B Covert Channel Analysis", Naval Postgraduate School, Monterey, CA, 2015, pp. 1-35.

Rouf, I., et al., "Security and Privacy Vulnerabilities of In-Car Wireless Networks: A Tire Pressure Monitoring System Case Study", retrieved from https://www.usenix.org/legacy/event/sec10/tech/full_papers/Rouf.pdf on Apr. 23, 2019, pp.1-16.

Song, H. M., et al., "Intrusion Detection System Based on the Analysis of Time Intervals of CAN Messages for In-Vehicle Network", 2016 International Conference on Information Networking (ICOIN),_Kota Kinabalu, Malaysia, Jan. 13-15, 2016, pp. 63-68.

Stan, O., et al., "Protecting Military Avionics Platforms from Attacks on MIL-STD-1553 Communication Bus", retrieved from https://arxiv.org/pdf/1707.05032.pdf on Apr. 23, 2019, pp. 1-15.

Wolf, M., et al., "Security in Automotive Bus Systems", escrypt GmbH, Bochum, Germany, retrieved from http://www.weika.eu/papers/WolfEtAl_SecureBus.pdf on Apr. 23, 2019, pp. 1-13.

* cited by examiner

| Timestamp | Command | Data |
|---|---|---|
| 2987258 | 3841 | 0000 |
| 2987274 | 3041 | 0000 |
| 2987325 | 1821 | 5340 |
| 2987441 | 1821 | 4a4a |
| 2987556 | 1821 | 5342 |
| 2987677 | 2021 | b550 |
| 2987686 | 2021 | cab3 |
| 2988604 | 3c2e | 0078 0800 7f83 0000 0078 0800 7f83 0000 0000 |
| 2988637 | 3433 | 0078 0800 7f83 0000 0078 0800 7f83 0000 0078 |
| 2988668 | 2422 | 0078 0800 |
| 3112313 | 1821 | 5340 |
| 3112340 | 3c2e | 0078 0800 7f83 0000 0078 0800 7f83 0000 0000 |
| 3112447 | 1821 | 4a41 |
| 3112553 | 1821 | 5342 |
| 3112668 | 2021 | b550 |
| 3112674 | 2021 | cab3 |
| 3151506 | 3433 | 0078 0800 7f83 0000 0078 0800 7f83 0000 0000 |
| 3151529 | 2422 | 0778 800 |
| 3237303 | 1821 | 5340 |
| 3237337 | 3c2e | 0078 0800 7f83 0000 0078 0800 7f83 0000 0000 |
| 3237350 | 3433 | 0078 0800 7f83 0000 0078 0800 7f83 0000 0078 |
| 3237360 | 2422 | 0778 0800 |
| 3237426 | 1821 | 4a41 |
| 3237538 | 1821 | 5342 |
| 3237655 | 2021 | b550 |
| 3237661 | 2021 | cab3 |
| 3362303 | 1821 | 5340 |

*FIG. 4*

| | Timestamp | Command | Data | Difference |
|---|---|---|---|---|
| 420 | 2987258 | 3841 | 0000 | |
| 505 | 2987274 | 3041 | 0000 | 16 | 510
| 515 | 2987325 | 1821 | 5340 | 51 | 520
| 525 | 2987441 | 1821 | 4a4a | 116 |
| | 2987556 | 1821 | 5342 | 115 |
| | 2987677 | 2021 | b550 | 121 |
| | 2987686 | 2021 | cab3 | 9 |
| | 2988604 | 3c2e | 0078 0800 7f83 0000 0078 0800 7f83 0000 0000 | 918 |
| | 2988637 | 3433 | 0078 0800 7f83 0000 0078 0800 7f83 0000 0078 | 33 |
| 530 | 2988668 | 2422 | 0078 0800 | 31 |
| 535 | 3112313 | 1821 | 5340 | 123645 |
| | 3112340 | 3c2e | 0078 0800 7f83 0000 0078 0800 7f83 0000 0000 | 27 |
| | 3112442 | 1821 | 4a41 | 102 |
| | 3112553 | 1821 | 5342 | 111 |
| | 3112668 | 2021 | b550 | 115 |
| 540 | 3112674 | 2021 | cab3 | 6 |
| 545 | 3151506 | 3433 | 0078 0800 7f83 0000 0078 0800 7f83 0000 0000 | 38832 |
| 550 | 3151529 | 2422 | 0778 800 | 23 |
| 555 | 3237303 | 1821 | 5340 | 85774 |
| | 3237337 | 3c2e | 0078 0800 7f83 0000 0078 0800 7f83 0000 0000 | 34 |
| | 3237350 | 3433 | 0078 0800 7f83 0000 0078 0800 7f83 0000 0078 | 13 |
| | 3237360 | 2422 | 0778 0800 | 10 |
| | 3237426 | 1821 | 4a41 | 66 |
| | 3237538 | 1821 | 5342 | 112 |
| | 3237655 | 2021 | b550 | 117 |
| 560 | 3237661 | 2021 | cab3 | 6 |
| 565 | 3362303 | 1821 | 5340 | 124642 |

*FIG. 5*

| Timestamp (epoch) | Bus Commands | Time difference with previous command |
|---|---|---|
| 1520546456612404 | 1821 | -- |
| 1520546456612437 | 2422 | 33 |
| 1520546456612519 | 1821 | 82 |
| 1520546456612630 | 1821 | 111 |
| 1520546456612746 | 2021 | 116 |
| 1520546456612752 | 2021 | 6 |
| 1520546456737338 | 3c2e | 124586 |
| 1520546456737372 | 3433 | 34 |
| 1520546456737410 | 1821 | 38 |
| 1520546456737445 | 2422 | 35 |
| 1520546456737526 | 1821 | 81 |
| 1520546456737637 | 1821 | 111 |
| 1520546456737754 | 2021 | 117 |
| 1520546456737760 | 2021 | 6 |
| 1520546456862336 | 3c2e | 124576 |
| 1520546456862367 | 3433 | 31 |
| 1520546456862401 | 1821 | 34 |
| 1520546456862434 | 2422 | 33 |
| 1520546456862516 | 1821 | 82 |

*FIG. 6B*

| PatternID | Pattern Length | Pattern | Pattern Occurrences |
|---|---|---|---|
| 1 | 10 | \|3841\|3041\|3c2e\|1821\|3433\|2422\|1821\|1821\|2021\|2021 | 3 |
| 2 | 10 | \|3841\|3041\|1821\|3c2e\|1821\|3433\|2422\|1821\|2021\|2021 | 2 |
| 3 | 10 | \|3841\|3041\|1821\|1821\|3c2e\|3433\|1821\|2422\|2021\|2021 | 3 |
| 4 | 8 | \|3041\|1821\|1821\|1821\|2021\|2021\|3c2e\|3433 | 3 |
| 5 | 8 | \|1821\|1821\|1821\|2021\|2021\|3c2e\|3433\|2422 | 159 |
| 6 | 8 | \|1821\|3c2e\|3433\|2422\|1821\|1821\|2021\|2021 | 38 |
| 7 | 8 | \|1821\|3c2e\|3433\|1821\|2422\|1821\|2021\|2021 | 130 |
| 8 | 8 | \|3c2e\|3433\|1821\|2422\|1821\|1821\|2021\|2021 | 457 |
| 9 | 8 | \|1821\|1821\|3c2e\|3433\|2422\|1821\|2021\|2021 | 47 |
| 10 | 8 | \|3c2e\|3433\|1821\|1821\|2422\|1821\|2021\|2021 | 2 |
| 11 | 8 | \|1821\|1821\|3c2e\|1821\|3433\|2422\|2021\|2021 | 7 |
| 12 | 8 | \|1821\|1821\|1821\|3c2e\|3433\|2021\|2021\|2422 | 11 |
| 13 | 8 | \|1821\|3c2e\|1821\|3433\|1821\|2422\|2021\|2021 | 2 |
| 14 | 8 | \|1821\|1821\|1821\|3c2e\|3433\|2422\|2021\|2021 | 10 |
| 15 | 8 | \|1821\|1821\|3c2e\|3433\|1821\|2021\|2021\|2422 | 5 |
| 16 | 8 | \|1821\|1821\|1821\|3c2e\|2021\|2021\|3433\|2422 | 2 |
| 17 | 8 | \|1821\|1821\|3c2e\|1821\|2021\|2021\|3433\|2422 | 9 |
| 18 | 8 | \|1821\|3c2e\|3433\|1821\|1821\|2021\|2021\|2422 | 2 |
| 19 | 8 | \|3c2e\|3433\|1821\|1821\|1821\|2021\|2021\|2422 | 2 |
| 20 | 3 | \|3c2e\|1821\|1821 | 3 |
| 21 | 3 | \|1821\|1821\|1821 | 2 |
| 22 | 2 | \|1821\|1821 | 197 |
| 23 | 2 | \|2021\|2021 | 417 |
| 24 | 6 | \|1821\|3c2e\|1821\|3433\|2422\|1821 | 216 |
| 25 | 4 | \|3c2e\|1821\|3433\|2422 | 175 |
| 26 | 4 | \|3c2e\|3433\|1821\|2422 | 21 |
| 27 | 2 | \|3433\|2422 | 4 |
| 28 | 2 | \|3841\|3041 | 2 |
| 29 | 1 | \|3841 | 3 |
| 30 | 1 | \|1821 | 4 |
| 31 | 1 | \|2422 | 5 |

*FIG. 7A*

| Pattern ID | Pattern Length | Pattern | Pattern Occurrence |
|---|---|---|---|
| 1 | 2 | \|3c2e\|2021 | 2 |
| 2 | 2 | \|3c2e\|3433 | 4 |
| 3 | 1 | \|3c2e | 3 |
| 4 | 1 | \|3433 | 1 |
| 5 | 1 | \|2021 | 1 |

SYSTEMS AND METHODS FOR DETECTING A COMMUNICATION ANOMALY

STATEMENT OF GOVERNMENT INTEREST

This invention was made with government support under Contract No. FA8802-14-C-0001. The government has certain rights in the invention.

BACKGROUND

Serial communication bus technologies are used in many applications such as in integrated circuits, computer networks, and automobiles. The proliferation of computer networks and interconnectivity technologies has created a significant reliance on these networks. This necessitates the requirement to safeguard the data of these networks in order to protect confidential information and the integrity of the network. Providing adequate networking security can be challenging because network components such as a serial communication bus can have multiple vulnerabilities that can be compromised in such a way that can affect the performance and safety of the network. Security countermeasures can be employed to prevent hacking attacks from taking place, or to minimize and/or record the effect of such hacking attacks.

Existing security countermeasures such as a firewall, intrusion and malware detection software, data leakage prevention algorithms, and access control methodologies for serial bus communication have been proposed. However, these countermeasures can require extensive hardware modification. For certain legacy systems such as the serial communication bus standard MIL-STD 1553, any hardware modification to the MIL-STD 1553 communication bus is strictly prohibited. Moreover, the above countermeasures require changes to various components of the serial communication bus that may not be cost efficient due to its extensive deployment on various vehicles and aircrafts (e.g., AH-64 Apache, F-15 Eagle, F-16 Falcon, and F-35 Lightning II or Reaper). Accordingly, what is needed is security countermeasure that does not require modification to the MIL-STD 1553 communication serial bus standard.

SUMMARY

Disclosed herein are methods used for training a statistical and/or machine learning model to detect communication anomalies on a serial communication bus system. One of the disclosed methods includes: segmenting a training data set into a plurality of segments; identifying patterns within each of the plurality of segments; and generating a statistical model representing probability relationships between identified patterns. The probability relationships define the probability of a first pattern to occur after a second pattern. The method further includes segmenting the training data at every time interval, between two commands, where the time interval is above a predetermined time interval threshold, which can be a mean value of the time intervals dataset. In some embodiments, the mean value can be a winsorized mean, a truncated mean, or a modified mean value.

In some embodiments, the statistical model can be a Markov chain model. The method further includes identifying largest possible patterns before identifying smaller patterns within each segment, and/or identifying one or more commands that do not fit into any pattern. The patterns can be non-overlapping. Additionally, the method further includes: monitoring commands transmit from a second bus controller to one or more remote terminals; and determining whether a first command in a group of commands from the second bus controller to the one or more remote terminals is abnormal using the statistical model.

Also disclosed herein are systems used for training a statistical and/or machine learning model to detect communication anomalies on a serial communication bus system. One of those systems includes: one or more processors coupled to a memory, the one or more processors configured to: segment a training data set into a plurality of segments; identify patterns within each of the plurality of segments; and generate a Markov chain model representing probability relationships between identified patterns, wherein a probability relationship defines the probability of a first pattern to occur after a second pattern.

The present disclosure further describes a method for detecting a communication anomaly. The method includes: monitoring commands transmit from a bus controller to one or more remote terminals; and determining whether a first command in a group of commands from the bus controller to the one or more remote terminals is abnormal using a trained Markov chain model that defines a probability of the first command occurring after a group of one or more commands previously sent by the bus controller. The Markov chain model is trained using identified patterns in each of a plurality of training data segments, which are segmented based on a statistical analysis of time intervals between two consecutive commands of an entire training data set.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIG. 4 is a table showing example data.

FIG. 5 is a table showing tabulated data in accordance with some embodiments of the present disclosure.

FIG. 6B is a table showing an example data log.

FIGS. 7A and 7B are tables showing tabulated pattern data in accordance with some embodiments of the present disclosure.

FIG. 12 is a table showing a data log of a modified data set and identified patterns within the modified data set in accordance with some embodiments of the present disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Overview

Figure 1:
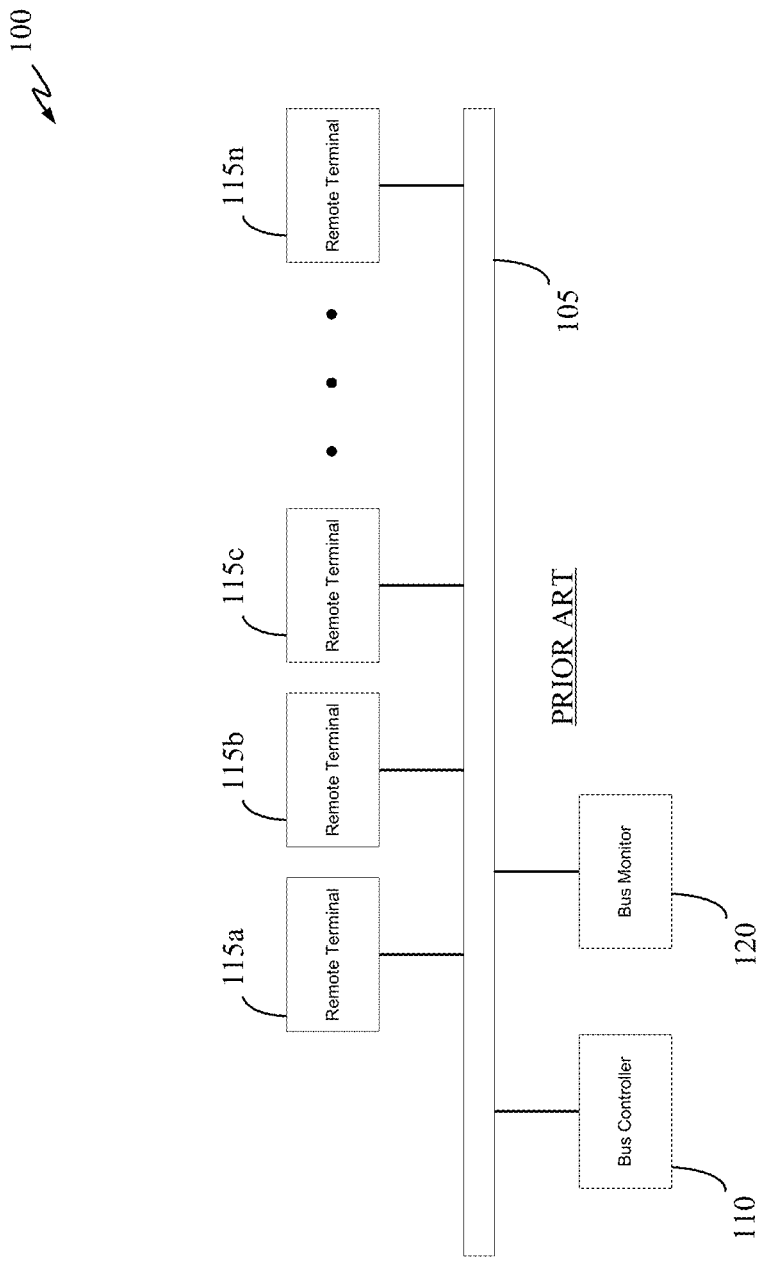
FIG. 1 illustrates a serial communication bus system.

The MIL-STD 1553 communication serial bus is a military standard developed by the US Department of Defense in the early 1970s. The 1553 communication bus was designed to be highly fault tolerance with multiple layers of redundancy. Today, the 1553 communication bus remains widely used in military aircrafts and spacecraft on-board data handling subsystems. FIG. 1 illustrates a standard 1553 communication bus system 100 that include a bus 105, a bus controller 110, and a plurality of remote terminals 115*a*, 115*b*, 115*c* and 115*n*. Bus controller 110 is communicatively coupled to each of remote terminals 115*a*-115*n* by bus 105, which provides a single data path between bus controller 110 and all remote terminals 115*a*-115*n*. A 1553 communication bus system can also include a bus monitor 120, which is designed to capture or record data for analysis. Bus monitors 120 can only read data from bus 105 and is not allowed to take part in the data transfer process.

In redundant bus implementations, several buses can be used to provide more than one data path. Redundant bus systems can include a dual redundant bus system, a tri-redundant bus system, etc. All transmissions of messages (e.g., commands) onto bus 105 are accessible by bus controller 110 and each of the remote terminals 115, which are communicatively coupled to bus 105. As specified by the MIL-STD 1553, all communication on bus 105 is under the control of bus controller 110 using commands from bus controller 110 to one or more remote terminals (e.g., 115*a*, 115*c*) to receive or transmit data. In other words, all communication between bus controller 110 and a remote terminal or between any remote terminals is initiated by the bus controller. Remote terminals 115 (e.g. subsystems and devices) cannot initiate a data transfer on their own. Each of remote terminals 115 can include a transceiver for data transfer between bus 105 and one or more subcomponents of the remote terminal. Each remote terminal can be directly connected to bus 105 and exchanges data with the subsystem via a dual port RAM.

The 1553 communication bus was developed before the advent of the Internet and cyberattacks such as denial-of-service (DOS) attack, command injection, and command/message manipulation. Today, cyberattacks are rampant and can play a major role in modern warfare, particularly on a widely adopted platforms such as the MIL-STD-1553 standard. However, due to its widespread deployment in many platforms, applying changes any of the original components of the 1553 communication bus can be cost prohibitive.

Figure 2:
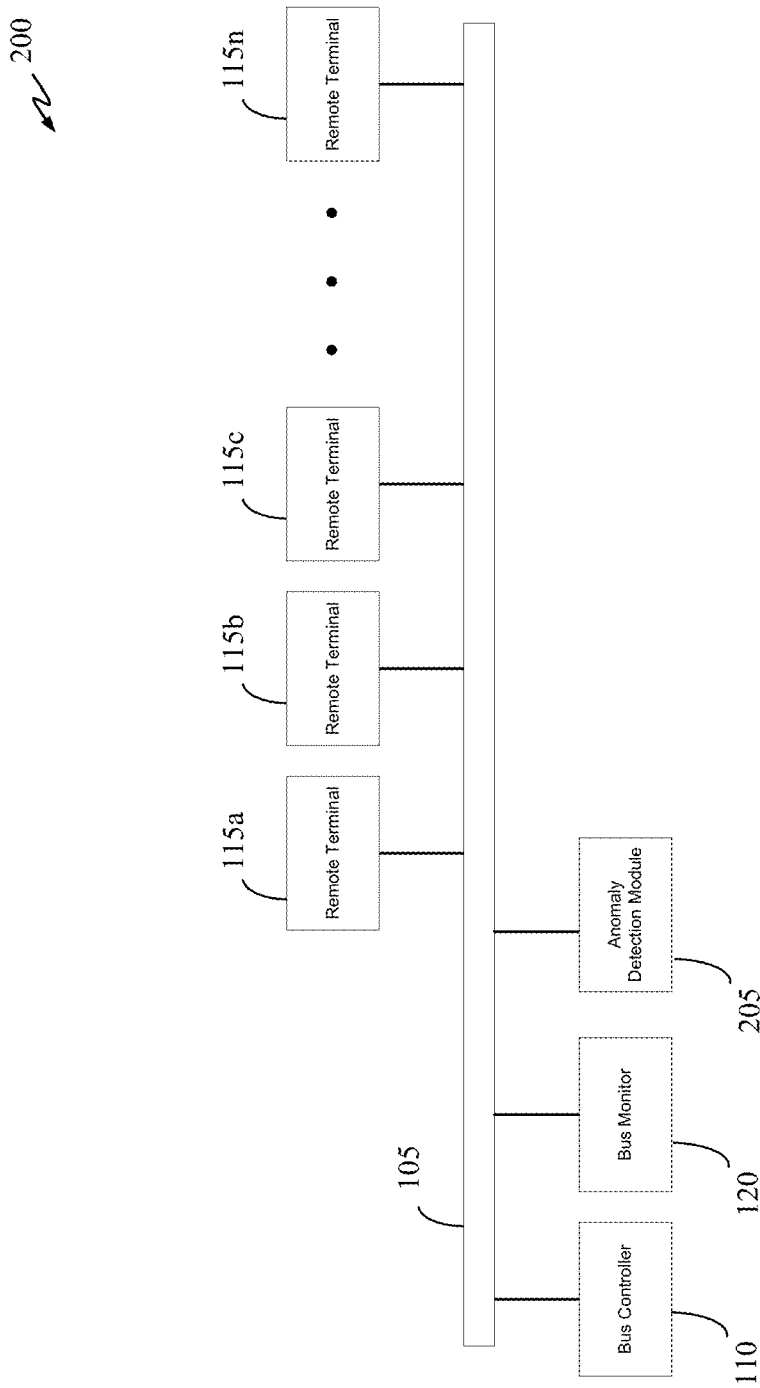
FIG. 2 illustrates a serial communication bus system having an anomaly detection module in accordance with some embodiments of the present disclosure.

FIG. 2 illustrates an example communication bus system 200 for detecting communication anomalies on a serial communication bus in accordance with some embodiments of the present disclosure. System 200 can be implemented on various serial communication buses such as, but not limited to, MIL-STD-1553, CAN, SpaceWire, and FireWire. System 200 can prevent malicious attacks by detecting communication anomaly before any real harm can be effectuated to any component of the system. Once the anomaly is detected, system 200 can prevent the communication anomaly from reaching any of the remote terminals. Alternatively, system 200 can prevent the remote terminals from executing the anomalous communication message/command. System 200 can include a notification module (not shown) configured to provide instant alert to a command center that could take appropriate action to rectify the anomalous command.

Similar to communication bus system 100, bus system 200 can include bus 105, bus controller 110, a plurality of remote terminals 115*a* through 115*n*, and bus monitor 120. However, bus system 200 also includes a communication anomaly detection module 205 that is configured to monitor commands from bus controller 110 and/or data being transmitted over bus 105. Anomaly detection module 205 can be an additional component (subsystem) of bus monitor 120 or can be a standalone module as shown in FIG. 2. In some embodiments, anomaly detection module 205 can include a statistical model trained to recognize communication anomalies based at least on the probability distribution of patterns of one or more commands. The statistical model employed by anomaly detection module 205 can be stochastic model such as a Markov chain that describes a sequence of possible commands in which the probability of each command depends on the occurrence of a group of one or more commands.

The stochastic model (e.g., Markov chain) of anomaly detection module 205 can be trained using a training data set that comprises data generated by bus system 200. The training data set can be a data set of historical command data, test data, and/or simulated command data involving bus 105, bus controller 110, and one or more remote terminals 115*a*-115*n*. For example, the training data set can consist of simulated, but valid, commands that would be carried out in a real or simulated mission by a machine (e.g., vehicle, aircraft, satellite) having bus system 200. The simulated commands would involve many possible combinations of commands between the machine and its various components (e.g., remote terminals). In another example, the training data set can be historical data of commands of a machine operating in various missions, environments, simulations, etc. A training data set can have thousands or millions of commands.

In some embodiments, anomaly detection module 205 can use other types of statistical model such as the hidden Markov model to learn the various sequences of possible commands in which the probability of each command depends on the occurrence of a previous group of one or more commands. In other embodiments, anomaly detection module 205 can use a machine learning model to learn the various sequences of possible commands in which the probability of each command depends on the occurrence of a previous group of one or more commands. In some embodiments, anomaly detection module 205 can use a machine learning model to learn the relationships between one or more groups of commands or between one or more commands and one or more remote terminals. Machine learning models can include neural network models such as, but not limited to, a recurrent neural network, a convolutional neural network, and a feedforward neural network.

Once the anomaly detection module 205 is trained to recognize and/or learn the various sequences (e.g., patterns) of possible commands and the transition probability between any two sequences, anomaly detection module 205 can be used to monitor real-time command(s) to detect communication anomalies. It should be noted that a sequence (e.g., pattern) of commands can have one or more commands. In other words, a sequence of command can have one command, ten commands, or hundreds of commands, etc.

In some embodiments, to train anomaly detection module 205, a training data set is segmented into a plurality of segments based on the value of the time interval between two commands. A time interval is the time difference between the timestamps of two consecutive commands. In some embodiments, if the time interval between x and y commands is greater than a time interval threshold, then the training data set can be segmented at the location between x and y. In other words, commands x and y will belong to different segments of data. A time intervals dataset of the training data set can be analyzed to determine whether the training data set should be segmented at each time interval location. A training dataset can be segmented into any number of segments, depending upon the value of the time interval threshold and/or the size of the training dataset. A time intervals dataset can be a portion of time intervals of a data log or all available time intervals of a data log of a bus.

In some embodiments, the time interval threshold can be the mean, median, or variance of the time intervals dataset. It should be noted that the time interval threshold can be calculated based on other statistical functions. In some embodiments, the time interval threshold can be the mean of the time intervals dataset. The mean can be a winsorized mean, a truncated mean, or a modified mean value. In some embodiments, time interval threshold is determined based on the winsorized mean of the time intervals dataset of the training data set (or a portion of the training data set).

Once the training data set is segmented into a plurality of segments, patterns and non-patterns are identified in each of the segments. In some embodiments, for each segment, larger patterns can be identified first. Next, smaller patterns can be identified after larger patterns can no longer be identified. It should be noted that a pattern can have one or more commands. A non-pattern can have one or more commands that do not fit into any of the identified patterns. In some embodiments, a hashing algorithm (e.g., hash map) can be used to identify patterns and non-patterns in each data segment. Other patterns recognition methods can also be used such as pattern recognition neural networks.

Next, a statistical model of the patterns is generated. In some embodiments, a Markov chain model can be generated using results from the patterns identified by the hashing operation. In some embodiments, the Markov chain is generated to describe a sequence of possible commands in which the probability of each command depends on the occurrence of a group of one or more commands. For example, the Markov chain can show that the probability of the transition ("transition probability") from a group of commands consisting of commands 'w', 'x', and 'y' to a command 'v' to be 0.6 percent. In another example, the Markov chain can show that the probability of the transition from a group of commands consisting of commands 'w', 'x', and 'y' to a command 't' to be 0.01 percent. In another example, the Markov chain can show that the probability of the transition from a group of commands consisting of commands 'w', 'x', and 'y' to a group of commands consisting of command 'w', 't', and 'v' to be 0.001 percent or less.

In some embodiments, whether a bus command or a group of commands is anomalous depends on the transition probability indicated by the Markov chain. A command can be considered anomalous if its transition probability (i.e., the transition from the previous group of command to the current command) is less than a transition probability threshold, which could be set at any value. A command can also be considered anomalous if its transition probability is not defined by the Markov chain. In some embodiments, the transition probability threshold can be set based on empirical data or at an arbitrary low value where the rate of false negative is acceptable or very low.

Communication Anomaly Training & Detection

Figure 3:
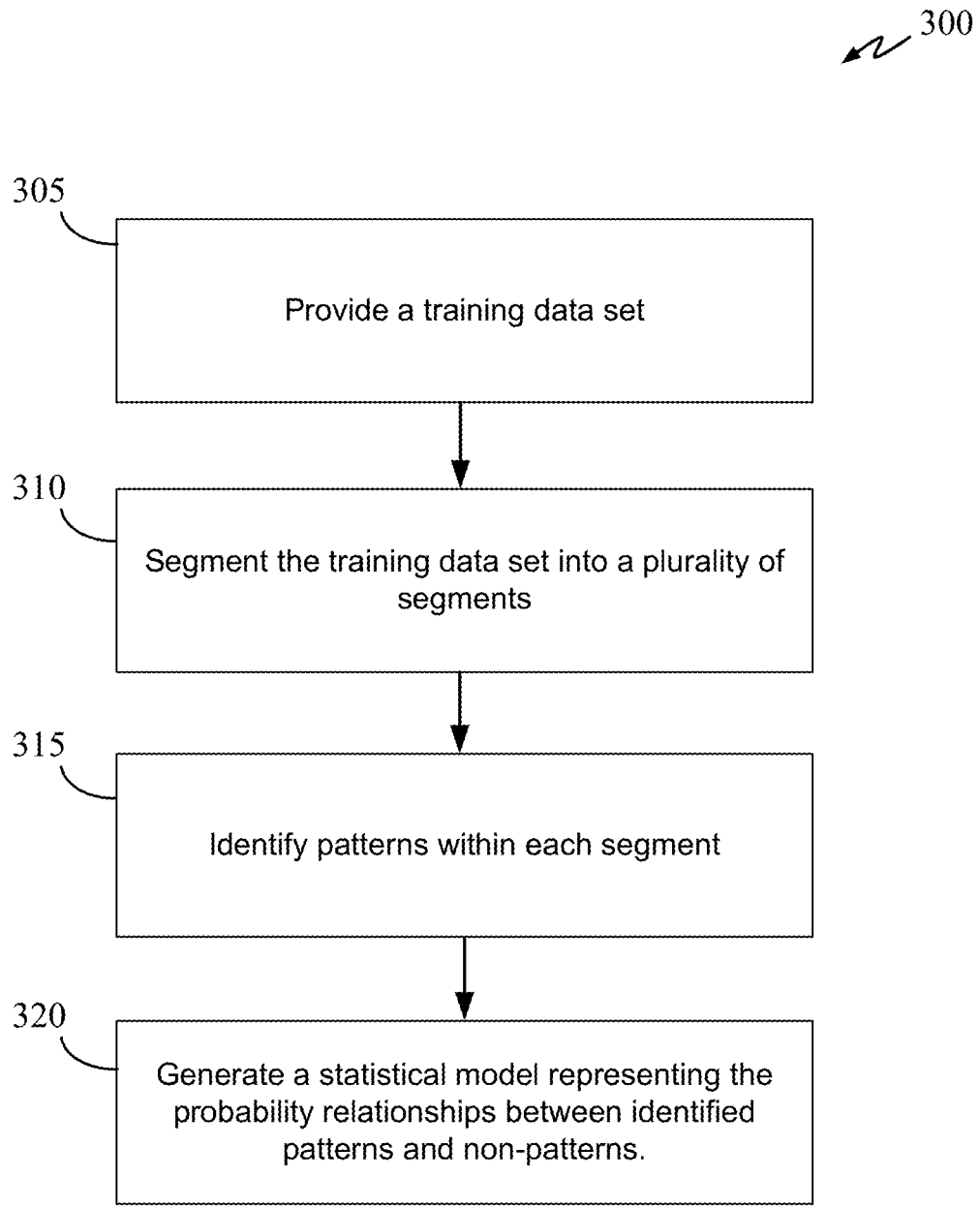
FIG. 3 is a flow diagram of a training process in accordance with some embodiments of the present disclosure.

FIG. 3 illustrates a training process 300 for training anomaly detection module 205 in accordance with some embodiments of the present disclosure. Process 300 starts at 305 where a training data set is provided. The training data set can have thousands or millions of commands collected in real or simulated systems operating over a long period of time. The training data set can be specific to a particular bus architecture. For example, to train anomaly detection module 205 to detect communication anomalies on a system using a 1553 communication bus, the training data set should comprise of data from one or more systems using a 1553 communication bus. In another example, to train anomaly detection module 205 to detect communication anomalies on a system using a SpaceWire system, the training data set should comprise data from one or more systems using a SpaceWire communication bus. Data for the training data set can also be simulated using simulated systems having the communication bus of interest and associated remote systems and subsystems. In some embodiments, each command in the training data set has a timestamp indicating the time it was transmitted relative to other commands.

At 310, the training data set is segmented into a plurality of segments. The training data set can be segmented based on a number of data points (e.g., sample size), a time duration (e.g., hours, day, etc.), or a statistical function of the time intervals dataset. In some embodiments, the training data set can be segmented based on a mean value of the time intervals dataset. A time interval is the time difference between two timestamps of two consecutive commands. A statistical function of the time intervals dataset can be a mean, median, variance, a standard deviation, etc.

In some embodiments, the training data set can be segmented based on a winsorized mean value of the time intervals dataset. Alternatively, the training data set can be segmented based a truncated (trimming) mean or a modified mean value. In some embodiments, the training data set can be segmented by a data segmentation module (see item 920 of FIG. 9).

To better illustrate the segmentation procedure of block 310 using time intervals, FIGS. 3-6B will be discussed concurrently. FIG. 4 illustrates an example data portion 400 of a training data set. Each row of data in data portion 400 includes a timestamp portion 405, a command portion 410, and a data payload portion 415. Timestamp portion 405 can be based on the system's clock or another clock. For each command, an associate timestamp is generated to indicate when the command was issued. Command portion 410 contains the command issued at the associated timestamp. Data payload portion 415 contains the payload data associated with each command. Data payload portion 415 can be of any size.

In an example, row 420 of data portion 400 has a timestamp value of '2987258', a command value of '3841', and a data payload value of '0000'. For this particular system, the command value of '3841' corresponds to a command for an inertial system to be in a data reception mode. A command for the same inertial system to be in a data transmission mode would be '3c2e'. In another example, row 425 of data portion 400 has a timestamp value of '2987677, a command value of '2021, and a data payload value of 'b550. The command value of '2021, for this system, corresponds to a command for a solar array to be in a data reception mode.

FIG. 5 illustrates a process 500 for calculating differences of time intervals between two consecutive commands. As shown in FIG. 5, rows 420 and 505 have a timestamp value of '2987258' and '2987274', respectively. The time interval between rows 420 and 505 is indicated in box 510, which is 16 epochs. The time interval between rows 505 and 515 is 51 epochs, as shown in box 520. The time interval between rows 515 and 525 is 116 epochs, and so forth. Process 500 is then repeated until the time differences between all consecutive commands are computed. Of particular interests are time intervals between rows 530 and 535, 540 and 545, 550 and 555, and 560 and 565. The time intervals at these locations are very high as compared to other time intervals of data portion 400. For example, the time interval between rows 530 and 535 is 123645 epochs, and 124642 epochs between rows 560 and 565.

Figure 6A:
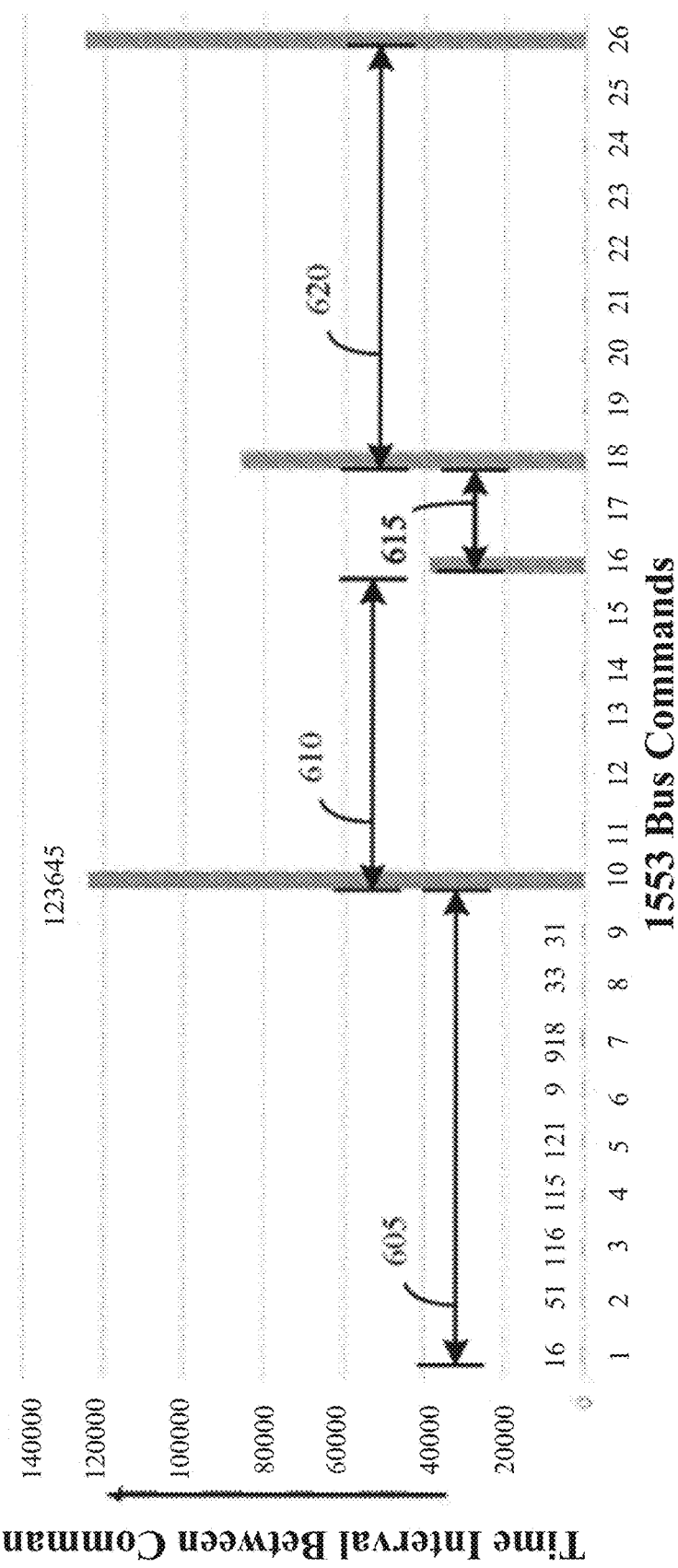
FIG. 6A is a graph illustrating results of a data segmentation process in accordance with some embodiments of the present disclosure.

FIG. 6A is a bar graph 600 illustrating time interval between commands. As illustrated in FIG. 6A, most time intervals are relatively small as compared to the time interval at time interval locations 10, 16, 18, and 26. As previously mentioned, the training data set can be segmented into a plurality of segments based on a statistical function of time intervals such as a mean, a variation of the mean, a median, a variance, etc. In some embodiments, the training data set can be segmented into a plurality of segments based on a winsorized mean of the time intervals. For each time interval location, if the time interval value is above a time interval threshold, the data set can be segmented at that time interval location, which can be the winsorized mean.

As illustrated in FIG. 6A, data portion 400 can be segmented at time interval locations 10, 16, 18, and 26 to create data segments 605, 610, 615, and 620. At each of these time interval locations, the time interval exceeds the time interval threshold, which can be any number above 1000 (depending on the size of the data set).

FIG. 6B is a table listing an example data log 650, which will be used to illustrate an example calculation of a winsorized mean for the time intervals in column 660. To calculate the winsorized mean, the first step is to sort the time interval values. This yields a sorted time-interval array of: [6, 6, 31, 33, 33, 34, 34, 35, 38, 81, 82, 82, 111, 111, 116, 117, 124576, 124586]. Next, the array cut-off position is calculated in accordance with equation (1).

$$\text{Cutoff Position} = \text{Ceiling}(N * \text{Percentage}_{Cutoff}) \tag{1}$$

In equation (1), N is the number of time intervals in the data set. In this example, N equals 18. Through experimentation, the most optimized value for $\text{Percentage}_{Cutoff}$ is 0.19. This yields a cutoff position of 4. In some embodiments, the optimum value for the $\text{Percentage}_{Cutoff}$ variable is determined using monte-carlo simulations. In some embodiments, value for the $\text{Percentage}_{Cutoff}$ variable can be between 0.1 and 0.3. In some embodiments, for a large data set of thousands of data points, the value of 0.19 is selected.

With $\text{Percentage}_{Cutoff}$ set at 0.19, the cutoff position equals to 4, which means that the time interval values in the first and last 4 positions in the sorted array will be replaced with the value of fourth and N-4 positions, respectively. The new array becomes: [33, 33, 33, 33, 33, 34, 34, 35, 38, 81, 82, 82, 111, 111, 116, 116, 116, 116]. The mean of the new array is the winsorized mean, which is 68.7.

Referring back to FIG. 3, at 315, patterns and non-patterns are identified for each of the segments. In some embodiments, larger patterns within each segment are identified prior to smaller patterns being identified. Larger patterns are patterns having a larger number of commands than smaller patterns. In other words, patterns having the largest possible of number of commands are identified first. In some embodiments, the patterns are non-overlapping. This means that once a command is part of a pattern, that command cannot be part of another pattern. A non-pattern is one or more commands that do not fit into any of the identified patterns. A segment can have a combination of patterns and non-patterns. A segment can also have only patterns where there is no single command that does not belong in a pattern. In other words, all of commands of a segment can be part of one or more non-overlapping patterns.

Figure 9:
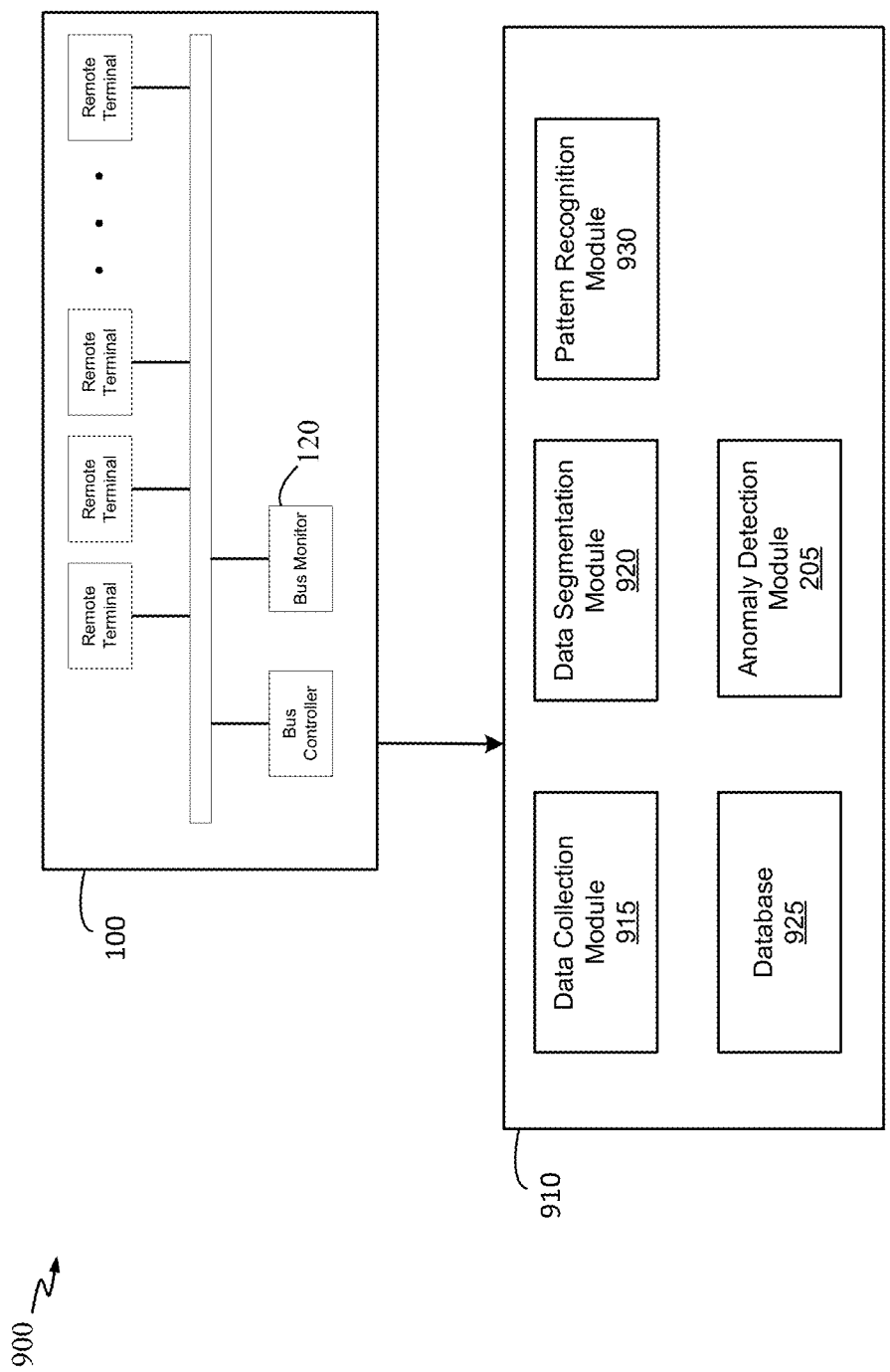
FIG. 9 illustrates a block diagram of a training system in accordance with some embodiments of the present disclosure.

In some embodiments, patterns can be identified using a pattern recognition module (see item 930 of FIG. 9). The pattern recognition module can identify patterns in each segment using a hashing algorithm such as a hash map. Alternatively, the pattern recognition module can identify patterns in each segment using clustering analysis or other machine learning algorithms (e.g., feed forward network, decision trees, etc.).

FIGS. 7A and 7B illustrate the result of the patterns identification/recognition process described at block 315. As illustrated, for the training data set that comprises data portion 400, 31 different patterns (FIG. 7A) and 5 non-patterns (FIG. 7B) were identified. The frequency of each pattern (or non-pattern) is listed in column 705. The length or number of commands in the pattern (or non-pattern) is listed in column 710. The list of commands for each pattern (or non-pattern) is shown in column 715, and the number of pattern occurrences are listed in column 720. The patterns and non-patterns of the training data set can be stored in a database, which can be retrieved to train a statistical model to map out the relationships between identified patterns.

At 320, a statistical model is trained to accurately represent the transitional relationships between patterns, between pattern(s) and non-pattern(s), and/or between non-pattern(s). In some embodiments, the statistical model is trained to map out transition probability (between identified patterns. A probability relationship or transition probability defines the probability of a first pattern to occur after a second pattern. In other words, a statistical model is developed using the identified patterns and non-patterns at block 315 to represent the transitional relationship (or transition probability) between a first group of patterns to a second group of patterns. Each group of patterns can have one or more patterns.

In some embodiments, the statistical model can be a Markov chain model, which can be used to model the transitional probabilities between one or more patterns or non-patterns to another one or more other patterns or non-patterns. In some embodiments, the Markov chain model generates a probability relationships diagram that shows the transitional probabilities between command transitions. A command transition is the transition from a group of one or more commands to another group of one or more commands. Each group can be a part of an identified pattern or non-pattern, as identified in block 315. A transition probability is a probability of a group of command(s) to occur after another group of command(s). Stated differently, a transition probability is a probability of a pattern (or non-pattern) of command(s) to occur after another pattern (or non-pattern) of command(s).

Figure 8:
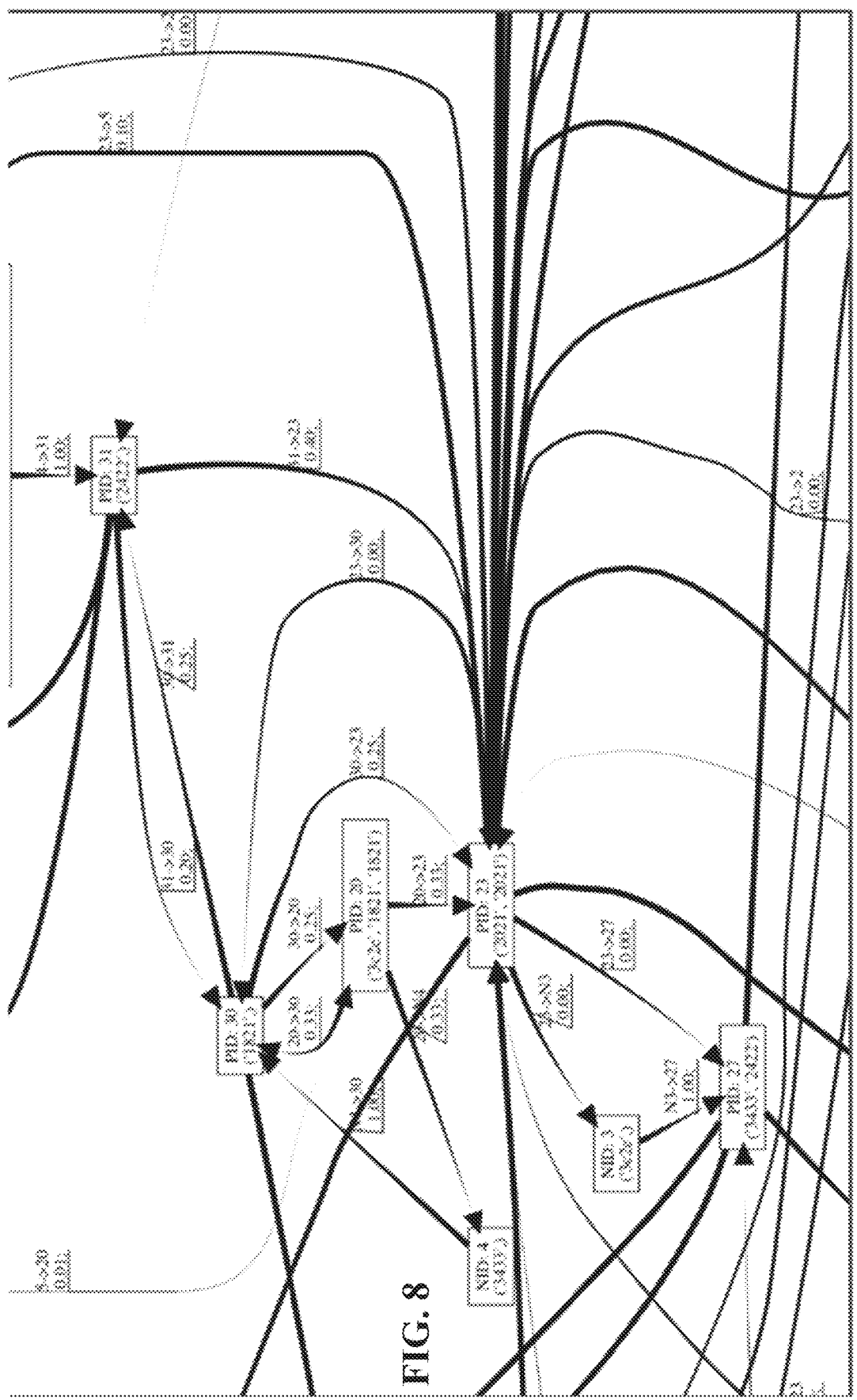
FIG. 8 is a graph showing a trained Markov chain model in accordance with some embodiments of the present disclosure.

FIG. 8 is a graphical illustration of a portion of a Markov chain model 800 generated at block 320 in accordance with some embodiments of the present disclosure. Using model 800, anomaly detection module 205 can determine the probability of a second group of commands occurring after a first group of commands. This is the transition probability between the first and second groups of commands. If the transition probability is very low or is not represented by the Markov chain model, then anomaly detection module 205 can flag the second group of commands as anomalous. If the transition probability is above a certain threshold, then anomaly detection module 205 can flag the second group of commands as normal.

FIG. 9 is a block diagram of system 900 for training a statistical model to detect a communication anomaly in accordance with some embodiments of the present disclosure. System 900 includes communication bus system 100 or 200 and a training module 910, which can include a data collection module 915, a data segmentation module 920, a database 925, a pattern recognition module 930, and anomaly detection module 205. Training data sets can be collected using historical data and/or generated using simulations, as described in block 305, by data collection module 915. Simulated training data can be generated using bus communication system 100 having a plurality of remote terminals that are similar or identical to remote terminals of an actual/real system that will be secured with anomaly detection module 205. Data collection module 915 can be integrated with bus monitor 120 or can be independent of bus monitor 120. Data collected by data collection module 915 can be stored in database 925.

Once a sufficient amount of data is collected, it can be statistically analyzed and segmented, as described in block 310, by data segmentation module 920. In some embodiments, data segmentation module 920 can segment the training data into a plurality of segments based on a statistical function of time intervals. Pattern recognition module 930 can be configured to identify patterns and non-patterns in each data segment as described in block 315. Pattern recognition module 930 can include hashing algorithms (e.g., hash map) and neural networks (e.g., recurrent neural network) configured to identify patterns and non-patterns in each data segment. Anomaly detection module 205 is then trained, as described in block 320, using the patterns and non-patterns identified by pattern recognition module 930. It should be noted that various functions performed by modules 205, 915, 920, and 930 can also be performed by one or more modules of training module 910. In other words, the demarcation of functional responsibilities between modules of training module 910 do not have to be clearly separately and can be shared between two or more modules.

Figure 10:
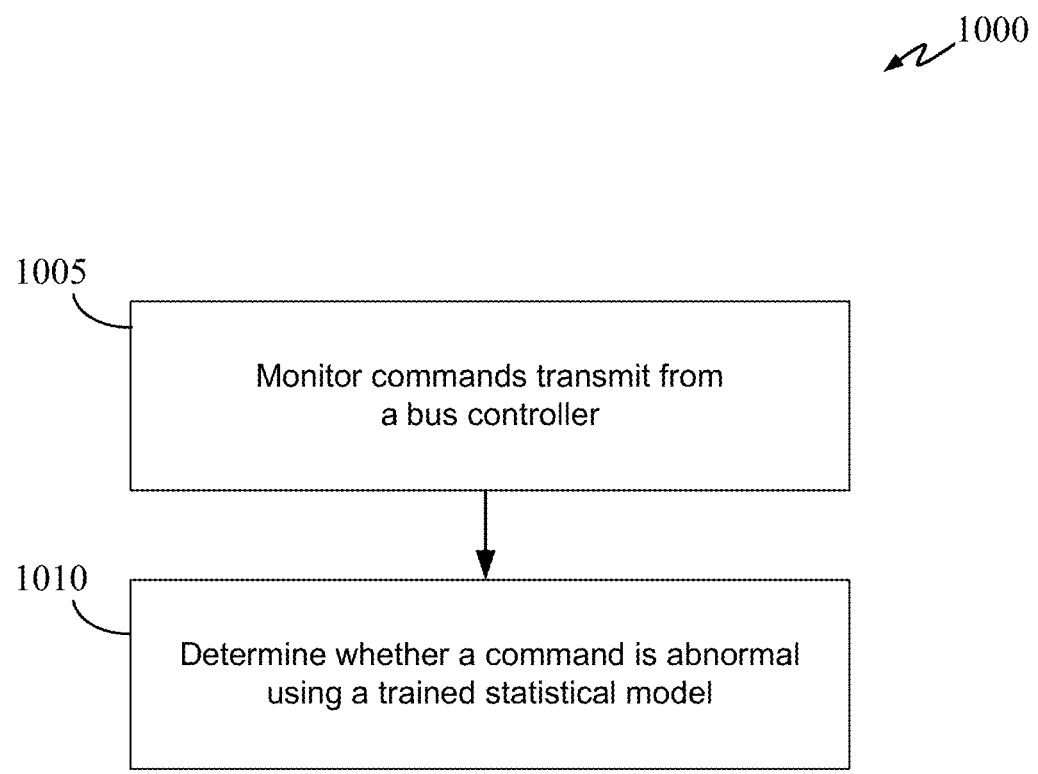
FIG. 10 is a flow diagram of a process for detecting a communication anomaly in accordance with some embodiments of the present disclosure.

FIG. 10 illustrates a process 1000 for detecting a communication anomaly in accordance with some embodiments of the present disclosure. Process 1000 starts at 1005 where commands transmitted from a bus controller (e.g., bus controller 110) of a communication system having a serial communication bus (e.g., bus 105) are monitored. Commands transmitted across the serial communication bus can also be monitored using a bus monitor (e.g., bus monitor 120). Process 1000 can determine whether each command issued by the bus monitor or intercepted from the data bus is anomalous using a trained statistical model. In some embodiments, the trained statistical model can be a Markov chain model, which can determine whether a command is anomalous based on its transition probability (i.e., the transition from a previous group of command to the current command). In some embodiments, if transition probability is less than a transition probability threshold (which can be set based on empirical data or at an arbitrary low value where the rate of false negative is acceptable or very low), the command can be flagged as anomalous. In some embodiments, if a command is determined to be anomalous, one or more of the following actions can be taken: a) notify central command of the communication anomaly; b) stop affected or all remote systems from executing any command; c) halt all data transmission and reception on the system; and d) request a retransmission of the previous one or more commands. In some embodiments, if the retransmission of the previous one or more commands do not match with the data in the log, the system may be flagged as compromised and additional security measures can be taken.

Empirical Data

Figure 11:
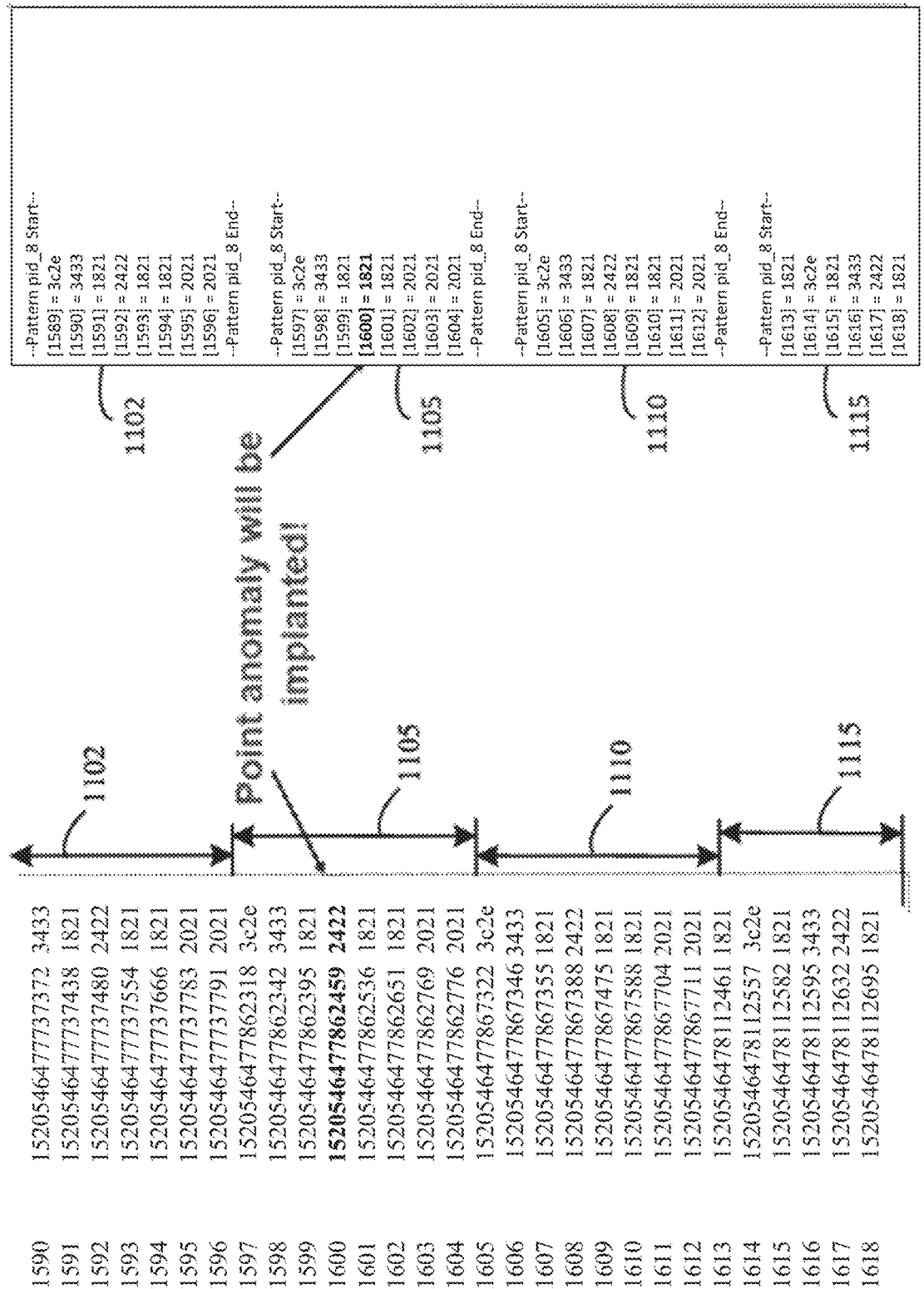
FIG. 11 is a table showing a data log and identified patterns within the data log in accordance with some embodiments of the present disclosure.
Figure 12:
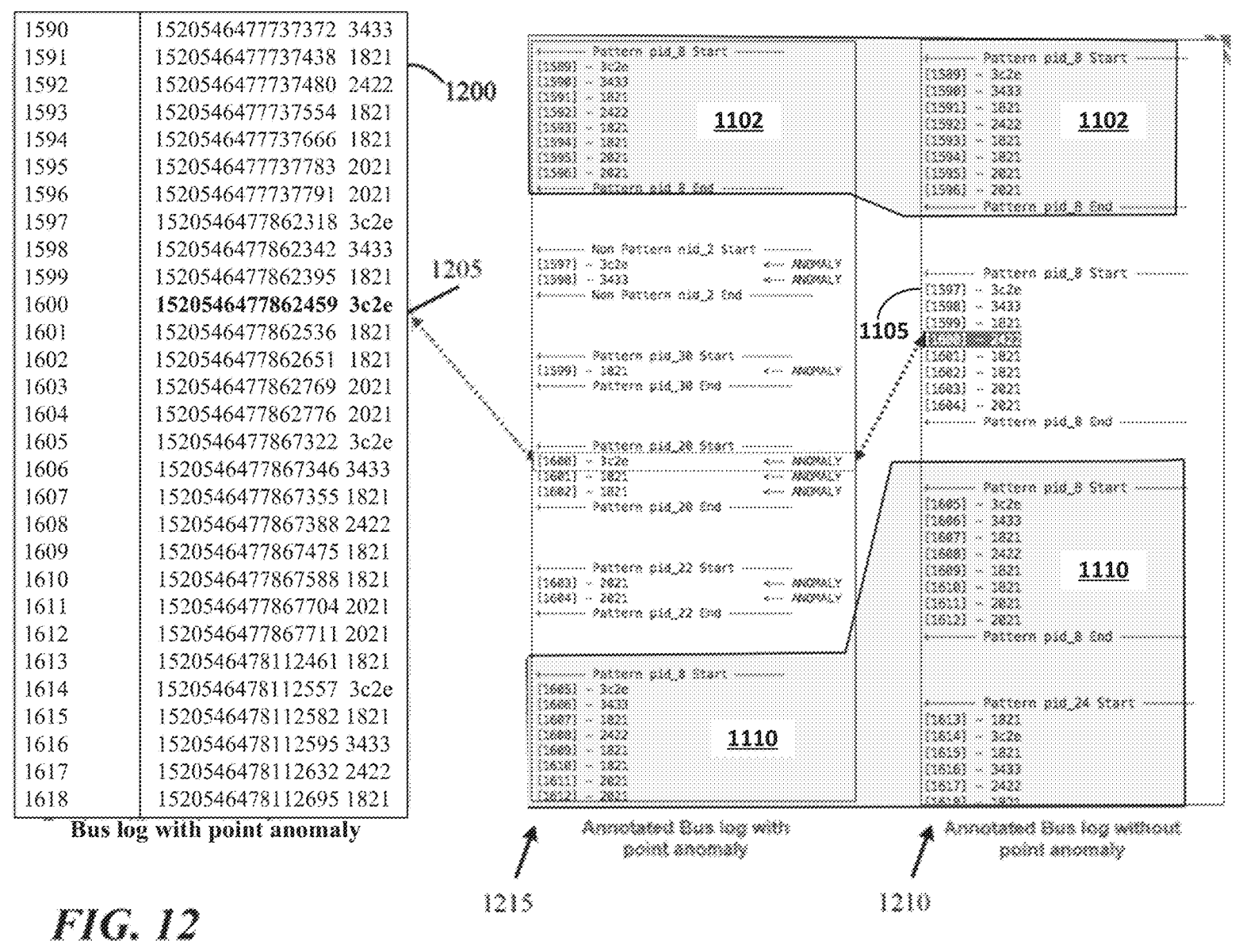

FIG. 11 illustrates a sample data set 1100 of one or more data segments. As shown, sample data set 1100 has four different non-overlapping patterns, patterns 1102, 1105, 1110, and 1115. To show that anomaly detection module 205 is working properly, a command from pattern 1105 will be modified and replaced with a random command. Specifically, for this experimental test, command '2422' is replaced with command '3c2e' as shown in FIG. 12, which illustrates sample data set 1200.

Sample data set 1200 is similar to data set 1100 except for the modified command 1205, which is modified to '3c2e' from '2422'. After the modification, data set 1200 is fed through anomaly detection module 205 to determine whether anomaly detection module 205 can successfully detect the command modification at 1205.

Log 1210 is the normal log from data set 1100. Log 1215 is a log generated by anomaly detection module 205 based on data set 1200. As indicated by log 1215, pattern 1105 no longer exists in data set 1200. In other words, pattern recognition module 930 cannot detect pattern 1105 in data set 1200. In log 1215, pattern 1105 is disrupted and is now a collection of eight individual non-pattern commands. In some embodiments, these non-pattern commands are flagged as an 'anomaly' because their transitional probabilities are either very low or not represented in the Markov chain. Accordingly, based on log 1215, anomaly detection module 205 can successfully detect the communication anomaly caused by the modification of a command at 1205. For this particular experiment, the command modification at 1205 causes a series of anomalies, which can be easily detected by anomaly detection module 205.

Figure 13:
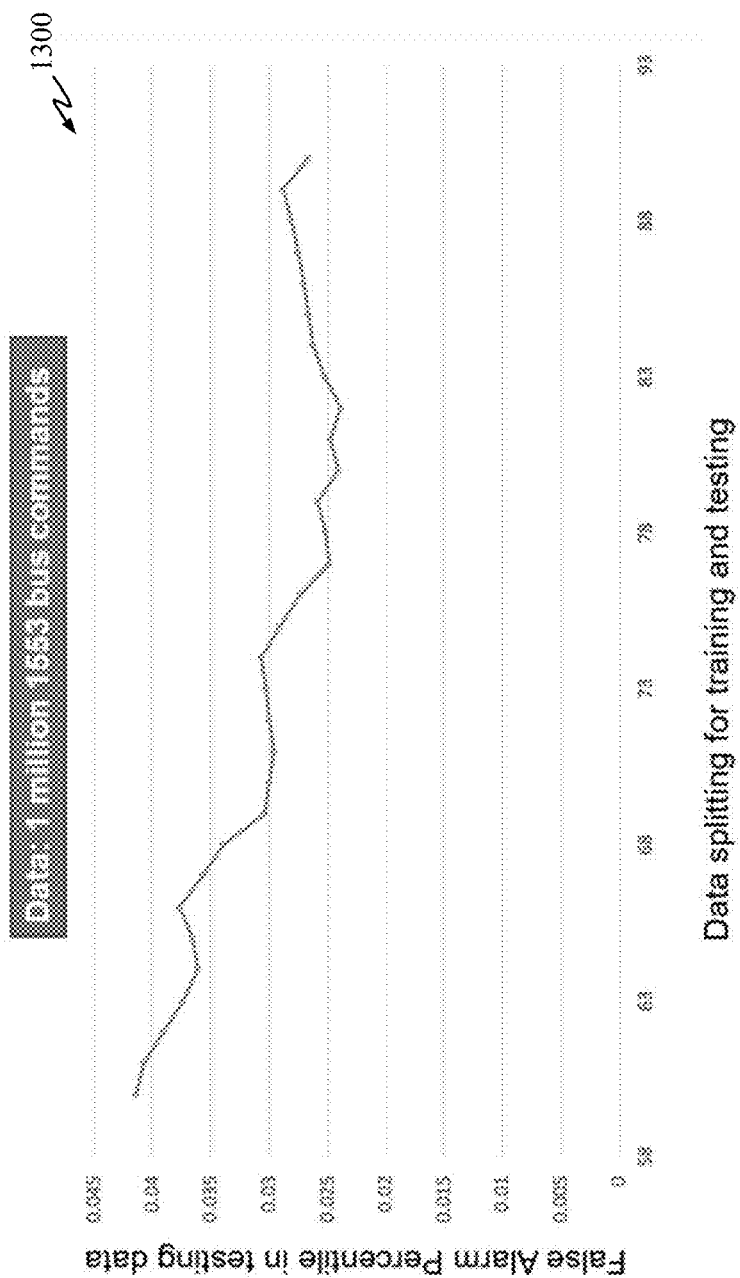
FIGS. 13 and 14 are graphs illustrating a rate of false alarm verses an amount of training data in accordance with some embodiments of the present disclosure.

FIG. 13 is a graph 1300 illustrating the rate of false alarm verses the amount of training data used to train anomaly detection module 205 in accordance with some embodiments of the present disclosure. A question that was explored by empirical studies is how much data should be used to train (e.g., process 300) a statistical model (e.g., Markov chain) or machine learning model (e.g., recurrent neural network) to yield the best accuracy or the lowest rate of false alarm. Using process 300, many versions of anomaly detection module 205 were trained, each version was trained using a different amount of training data. In generating graph 1300, a training data set of a million commands was used. Each version of anomaly detection module 205 was trained using a different percentage of the total available data (which consists of 1 million commands). For example, in one version of anomaly detection module 205, 60% of the training data was used for training. This means 40% of the data were not used in the training process. The unused amount of data (40%) contain both old and new commands. A new command is a command which was not used in the training data set.

For the 60% version of the anomaly detection module 205, the rate of false alarm was approximately 0.042 percentile. This means the accuracy is 1-0.042% or 95.8%. In another example, the version of anomaly detection module 205 trained using 80% of the available data, the rate of false alarm was approximately 0.024 (or 97.6% accuracy), which is the lowest false alarm rate. Based on graph 1300, it can be concluded that more training data do not necessary yield more accuracy. For example, when anomaly detection module 205 is trained using more than 83% of the available data, the rate of false alarm noticeably went up higher.

In some embodiments, anomaly detection module 205 can be trained using 80-90% of the available data points. In one embodiment, anomaly detection module 205 can be trained using 80% of the available data points (e.g., commands). In some embodiments, anomaly detection module 205 can be trained using 800,000-900,000 data points (e.g., commands). In one embodiment, anomaly detection module 205 can be trained using 800,000 data points (e.g., commands).

Figure 14:
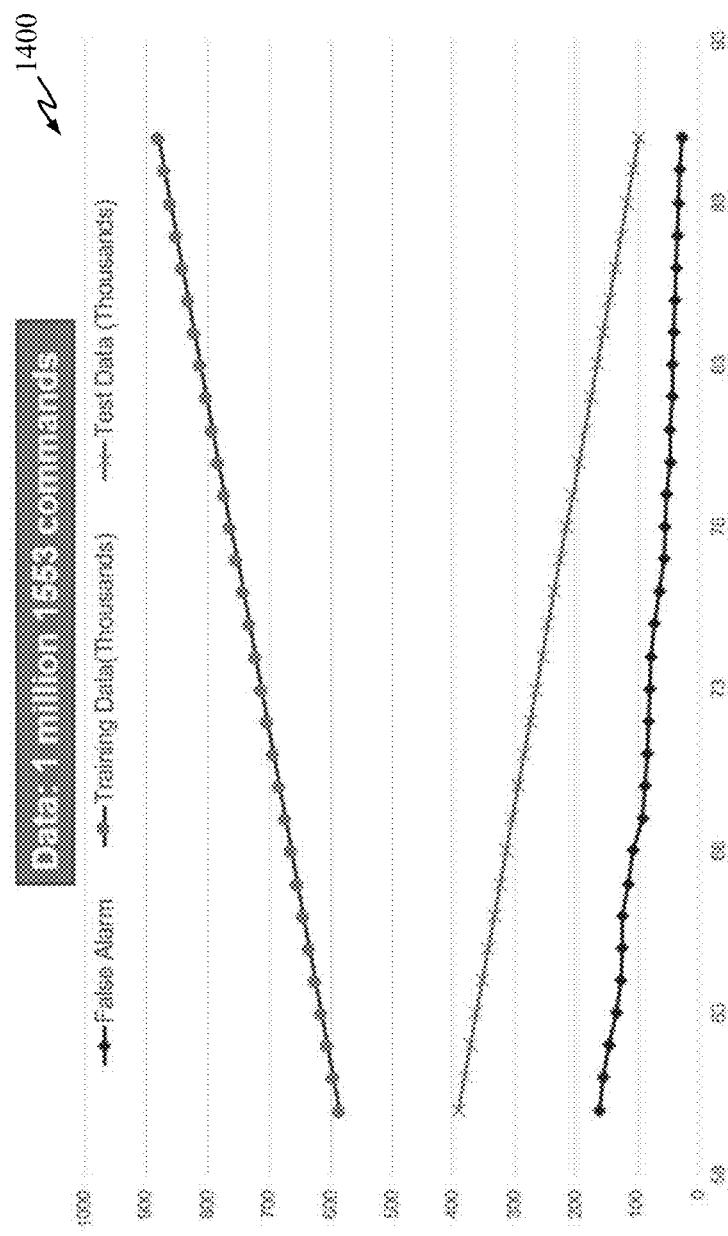

FIG. 14 is a graph 1400 illustrating rate of false alarm verses the amount of training data used and the amount of testing data tested. As illustrated in graph 1400, the rate of false alarm decreases as the amount of data used to train increases. However, the rate of false alarm begins to plateau above 80%. Accordingly, based on the cost of training and the accuracy that can be achieved, 80-90% of the available data training data set should be used to train the statistical or machine learning model.

System Architecture

Referring to FIG. 9, training module 910 algorithms and instructions that, when executed by a processor, cause the one or more processors to perform the respective the functions and features of process 300. One or more functions and features of training module 910 may be shared by modules (e.g., 205, 915, 920, 925, and 930) of training module 910. In some embodiments, training module 910 includes algorithms and instructions that, when executed by one or more processors, cause the one or more processors to: (a) segment a training data set into a plurality of segments; (b) identify patterns within each of the plurality of segments; and (c) generate a statistical model representing probability relationships between identified patterns.

In some embodiments, training module 910 also includes algorithms and instructions, that when executed by one or more processors, cause the one or more processors to: monitor commands transmit from a bus controller to one or more remote terminals; and determine whether a first command in a group of commands from the bus controller to the one or more remote terminals is anomalous (e.g., abnormal) using a trained Markov chain model that defines a probability of the first command occurring after a group of one or more commands previously sent by the bus controller. In this embodiment, the Markov chain model can be trained using identified patterns in each of a plurality of training data segments, which are segmented based on a statistical analysis of time intervals between two consecutive commands of an entire training data set.

Data collection module 915 includes algorithms and instructions, that when executed by one or more processors, cause the one or more processors to collect data from bus system 100 or bus 105.

Data segmentation module 920 includes algorithms and instructions, that when executed by one or more processors, cause the one or more processors to perform the respective the functions and features of at least block 310 of process 300.

Pattern recognition module 930 includes algorithms and instructions, that when executed by one or more processors, cause the one or more processors to perform the respective the functions and features of at least block 315 of process 300.

Anomaly detection module 205 includes algorithms and instructions, that when executed by one or more processors, cause the one or more processors to perform the respective the functions and features of at least block 320 of process 300 and/or block 1010 of process 1000.

Figure 15:
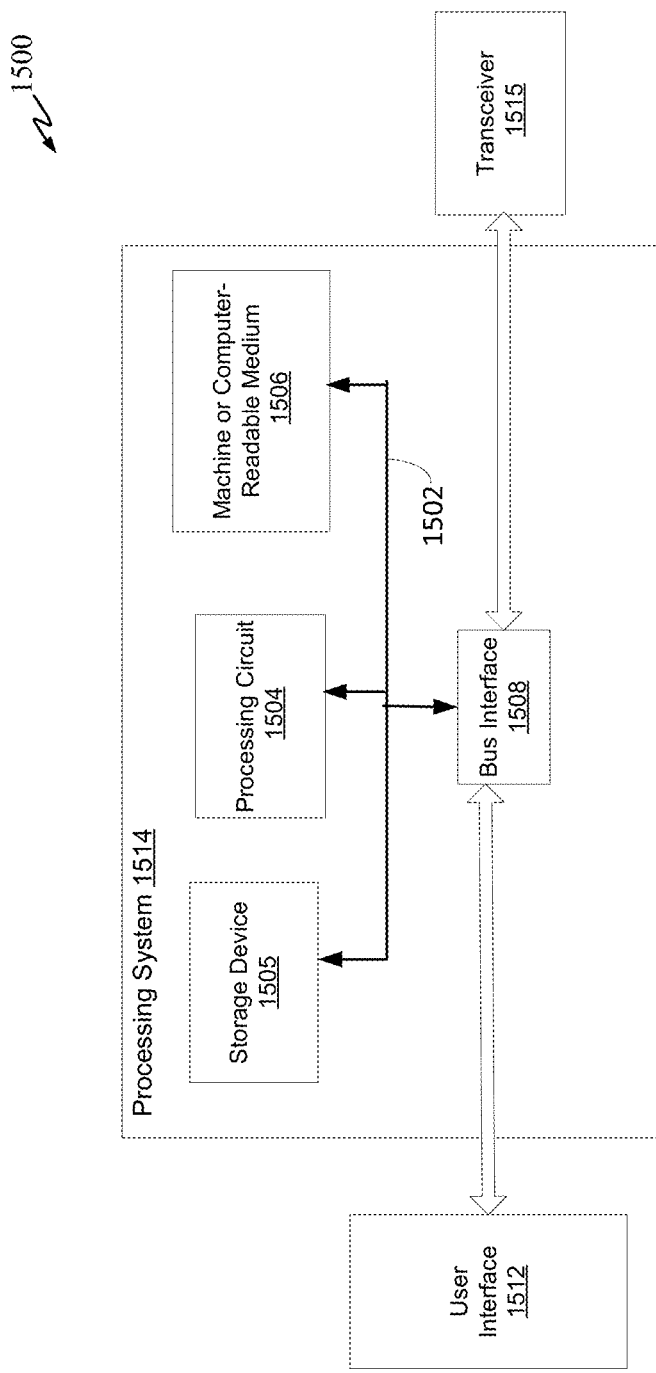
FIG. 15 illustrates a block diagram of a training and classification system in accordance with some embodiments of the present disclosure.

FIG. 15 illustrates an exemplary overall system or apparatus 1500 in which 300 and 1000 can be implemented. In accordance with various aspects of the disclosure, an element, or any portion of an element, or any combination of elements may be implemented with a processing system 1514 that includes one or more processing circuits 1504. Processing circuits 1504 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1504 may be used to implement any one or more of the processes described above and illustrated in FIGS. 3, 5, 6A, 7, 8, 10, 11, and 12.

In the example of FIG. 15, the processing system 1514 may be implemented with a bus architecture, represented generally by the bus 1502. The bus 1502 may include any number of interconnecting buses and bridges depending on the specific application of the processing system 1514 and the overall design constraints. The bus 1502 may link various circuits including one or more processing circuits (represented generally by the processing circuit 1504), the storage device 1505, and a machine-readable, processor-readable, processing circuit-readable or computer-readable media (represented generally by a non-transitory machine-readable medium 1509). The bus 1502 may also link various other circuits such as timing sources, peripherals, voltage regulators, and power management circuits, which are well known in the art, and therefore, will not be described any further. The bus interface 1508 may provide an interface between bus 1502 and a transceiver 1513. The transceiver 1510 may provide a means for communicating with various other apparatus over a transmission medium. Depending upon the nature of the apparatus, a user interface 1512 (e.g., keypad, display, speaker, microphone, touchscreen, motion sensor) may also be provided.

The processing circuit 1504 may be responsible for managing the bus 1502 and for general processing, including the execution of software stored on the machine-readable medium 1509. The software, when executed by processing circuit 1504, causes processing system 1514 to perform the various functions described herein for any particular apparatus. Machine-readable medium 1509 may also be used for storing data that is manipulated by processing circuit 1504 when executing software.

One or more processing circuits 1504 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

For example, instructions (e.g., codes) stored in the non-transitory computer readable memory, when executed, may cause the one or more processors to: segment a training data set into a plurality of segments; identify patterns within each of the plurality of segments; and generate a statistical model representing probability relationships between identified patterns.

The software may reside on machine-readable medium 1509. The machine-readable medium 1509 may be a non-transitory machine-readable medium. A non-transitory processing circuit-readable, machine-readable or computer-readable medium includes, by way of example, a magnetic storage device (e.g., solid state drive, hard disk, floppy disk, magnetic strip), an optical disk (e.g., digital versatile disc (DVD), Blu-Ray disc), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1509 may reside in the processing system 1514, external to the processing system 1514, or distributed across multiple entities including the processing system 1514. The machine-readable medium 1509 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, processes, features, and/or functions illustrated in the figures may be rearranged and/or combined into a single component, block, feature or function or embodied in several components, steps, or functions. Additional elements, components, processes, and/or functions may also be added without departing from the disclosure. The apparatus, devices, and/or components illustrated in the Figures may be configured to perform one or more of the methods, features, or processes described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and processes have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the one or more processors such that the one or more processors can read information from, and write information to, the storage medium. In the alternative, the storage medium may be integral to the one or more processors.

CONCLUSION

The enablements described above are considered novel over the prior art and are considered critical to the operation of at least one aspect of the disclosure and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

The invention claimed is:

1. A method for detecting a communication anomaly on a communication bus, the method comprising:
    segmenting a training data set into a plurality of segments, wherein the training data set comprises of commands from a bus controller of the communication bus;
    identifying patterns of commands within each of the plurality of segments, wherein each pattern comprises one or more commands from the bus controller of the communication bus using a pattern recognition module;
    generating a statistical model within a training module, the statistical model representing probability relationships between identified patterns of commands, wherein the probability relationships define the probability of a first pattern of commands to occur after a second pattern of commands; and
    determining whether the first command is abnormal based at least on a probability value of a transition between one or more preceding groups of command and the first command, the determination based on an undefined transition probability.

2. The method of claim 1, wherein segmenting the training data set comprises segmenting the training data at every time interval, between two commands, where it is above a predetermined time interval threshold.

3. The method of claim 2, wherein the predetermined time interval threshold comprises a mean value of time intervals between every two sequential commands of the training data set.

4. The method of claim 3, wherein the mean value comprises one of a winsorized mean, a truncated mean, or a modified mean value.

5. The method of claim 1, wherein the statistical model comprises a Markov chain model.

6. The method of claim 1, wherein identifying patterns of commands within each of the plurality of segments comprises identifying largest possible patterns of commands before identifying smaller patterns of commands within each segment.

7. The method of claim 1, wherein identifying patterns of commands within each of the plurality of segments comprises identifying one or more commands that do not fit into any pattern.

8. The method of claim 1, wherein the patterns of commands are non-overlapping.

9. The method of claim 1, wherein the communication bus comprises a MIL-STD-1533 or controller area network (CAN) communication bus.

10. The method of claim 1, further comprising:
    monitoring commands transmitted from a second bus controller to one or more remote terminals; and
    determining whether a first command in a group of commands from the second bus controller to the one or more remote terminals is abnormal using the statistical model.

11. The method of claim 1, wherein the determination is further based on a transition probability less than a threshold for at least one group of commands, and wherein the determination for at least one other group of commands is based on the undefined transition probability.

12. A system for detecting a communication anomaly on a communication bus, the system comprising:
    a memory;
    one or more processors coupled to the memory, the one or more processors configured to:
        segment a training data set into a plurality of segments, wherein the training data set comprises of commands from a bus controller of a communication bus;
        identify patterns of commands within each of the plurality of segments, wherein each pattern comprises one or more commands from the bus controller of the communication bus using a pattern recognition module; and generate a Markov chain model representing probability relationships between identified patterns of commands, wherein the probability relationships define the probability of a first pattern to occur after a second pattern, wherein the one or more processors are configured to determine whether the first command is abnormal based at least on a probability value of a transition between one or more preceding groups of command and the first command, the determination based on an undefined transition probability.

13. The system of claim 12, wherein the one or more processors are further configured to segment the training data set at every time interval, between two commands, where it is above a predetermined time interval threshold.

14. The system of claim 13, wherein the predetermined time interval threshold comprises a mean value of time intervals between every two sequential commands of the training data set.

15. The system of claim 14, wherein the mean value comprises one of a winsorized mean, a truncated mean, or a modified mean value.

16. The system of claim 12, wherein the one or more processors are configured to identify patterns of commands within each of the plurality of segments by identifying largest possible patterns of commands before identifying smaller patterns of commands within each segment.

17. The system of claim 16, wherein the one or more processors are configured to identify one or more commands within a segment that do not fit into any pattern.

18. The system of claim 12, wherein the one or more processors are configured to identify patterns of commands that are non-overlapping.

19. The system of claim 12, wherein the one or more processors are configured to:
   monitor commands transmit from a second bus controller to one or more remote terminals; and
   determine whether a first command in a group of commands from the second bus controller to the one or more remote terminals is abnormal using the generated Markov chain model.

20. A method for detecting a communication anomaly on a communication bus, the method comprising:
   monitoring commands transmit from a bus controller to one or more remote terminals, wherein the bus controller and the one or more remote terminals are coupled to the communication bus;
   determining, using a pattern recognition module, whether a first command in a group of commands from the bus controller to the one or more remote terminals is abnormal using a trained Markov chain model within a training module that defines a probability of the first command occurring after a group of one or more commands previously sent by the bus controller, wherein the Markov chain model is trained using identified patterns of commands in each of a plurality of training data segments, wherein training data segments are segmented based on a statistical analysis of time intervals between two consecutive commands of an entire training data set; and
   determining whether the first command is abnormal based at least on a probability value of a transition between one or more preceding groups of command and the first command, the determination based on an undefined transition probability.

* * * * *